Jan. 5, 1960 S. W. BRIGGS 2,919,807
FILTER
Filed Dec. 3, 1957

INVENTOR
SOUTHWICK W. BRIGGS
BY *Raymond W. Colton*
ATTORNEY

United States Patent Office 2,919,807
Patented Jan. 5, 1960

2,919,807

FILTER

Southwick W. Briggs, Howard County, Md.

Application December 3, 1957, Serial No. 700,456

11 Claims. (Cl. 210—487)

A serious problem encountered in the use of pleated paper filters has been the tendency of their adjacent pleats to stick together as an effect of adherent cake formation and the resulting increase of differential pressures. As a consequence, the effective filter surface diminishes to a point where it is inadequate to cope with the conditions for which it was designed.

There have been efforts on the part of others to overcome this problem as will be exemplified by the disclosure of the patent to Fricke et al., 2,749,265, dated June 5, 1946, and that to Hough, 2,785,805, dated March 19, 1957. The disclosures of these prior patents are inapplicable to filter elements whose pleats are of unequal depths and moreover, their proposed use of adhesive causes inordinately large areas of the filter element to be rendered useless, sacrificing size and cost.

Substantially all commercial paper pleating machines produce variations in the depths of the pleats, although the pleats projecting in the same direction have peaks lying in substantially a single plane. This characteristic has been taken into account, in accordance with the present invention, by arranging such a pleated filter element in the form of an annulus with peaks formerly occupying the single plane constituting the outer periphery and lying substantially in a cylinder.

It has been found in accordance with the present invention that if a cover member is secured to the outer peaks of the filter element by axially separated annular bands of adhesive, the adjacent pleats will be held in spaced apart relationship just as effectively as though the adhesive were applied to the entire cover sheet and at the same time there will be a substantial saving in cost of both paper and adhesive.

The present invention also contemplates shrinking a cover member about a pleated filter element to the extent necessary to produce contact between an inner core member and the inner peaks of the filter element.

It is among the objects of the present invention to provide a filter comprising a permeable impregnated paper filter element having axial pleats defining a plurality of inner and outer peaks, the outer peaks being spaced apart and lying substantially in a cylinder, a permeable core disposed within the element for engagement with the inner peaks, an annular permeable cover member embracing the outer peaks, and axially separated annular bands of adhesive bonding the cover member to the outer peaks. In a preferred form of the invention, the cover member possesses annular imperforate areas for application of the adhesive bands and perforated areas between such bands. In such a case, it is preferred that the adhesive cover a minor area of the cover member.

A preferred form of the filter constituting the present invention comprises a permeable impregnated paper filter element having axial pleats with walls of unequal depths defining a plurality of inner and outer peaks and an adhesive bonding the cover member to the outer peaks. The cover member preferably contains an axial seam bonded with thermoplastic adhesive whereas the adhesive bonding the cover member to the filter element is preferably thermosetting. The walls of certain of the axial pleats are subjected to stress and the resulting bowed configuration of certain of such walls will effect engagement of the inner peaks of the filter element with the core.

The method of maintaining adjacent pleats of an annular filter element in spaced relationship according to the present invention comprises circumscribing the element with a cover member and simultaneously shrinking the cover member about and bonding it to peripheral portions of the pleats. Such shrinking and bonding are preferably effected at a superatmospheric temperature.

A more complete understanding of the invention will follow a description of the accompanying drawing wherein.

Figure 1:
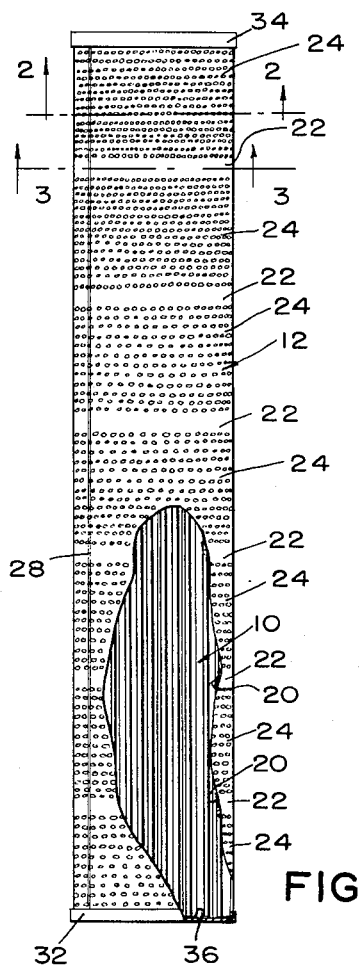
Fig. 1 is an elevation, partially broken away, depicting a filter element in accordance with the present invention.
Figure 2:
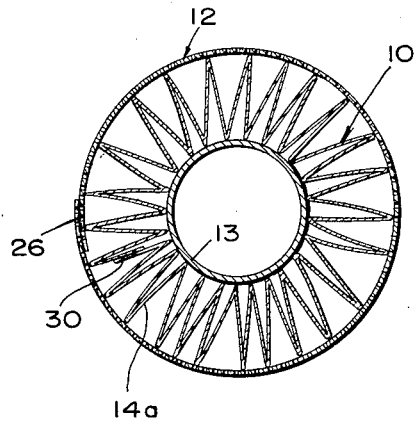
Fig. 2 is a section taken along line 2—2 of Fig. 1 on an enlarged scale.

In general, the filter shown in the drawing comprises an annularly arranged pleated filter element 10 circumscribed by a cover member 12 and containing a core 13. The material constituting these members may be paper impregnated with a resinous material such as a thermosetting phenolic condensation product in accordance with practice already common in the art.

Figure 3:
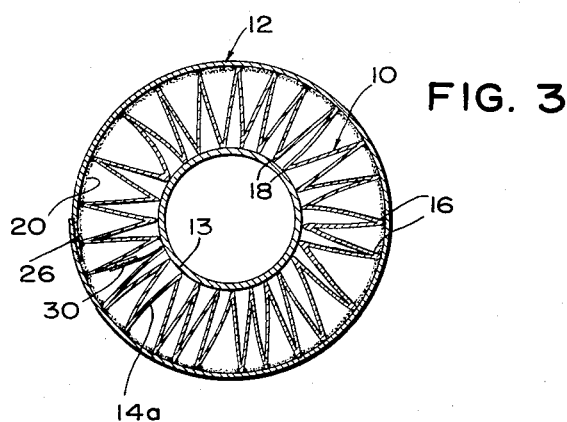
Fig. 3 is a section taken along line 3—3 of Fig. 1, also on an enlarged scale.
Figure 4:
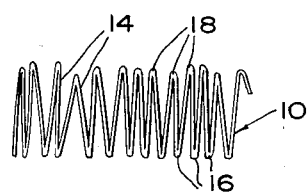
Fig. 4 is a fragmentary end elevation of a pleated filter element before it assumes its annular form.

As best shown in Fig. 4, the walls 14 of the filter element 10 vary in length so that the pleats themselves can be said to vary in depth. The downwardly disposed peaks 16 shown in Fig. 4, lie substantially in a plane whereas the upwardly disposed peaks 18 of this view fail to lie in a plane or even approach it. This creates a problem which has apparently been overlooked prior to this time since it is highly desirable that all of the peaks engage either the core 13 or the cover member 12. This is accomplished by causing the cover member 12 to impose sufficient stress upon the longer of the walls 14 to cause them to assume a bowed condition as will be exemplified by the wall 14a of Fig. 3. This contracting effect will cause the peaks 18 to engage the outer periphery of the cylindrical core 13, the cover member 12 being secured to the outer peaks 16 by bands of adhesive 20 applied to the imperforate areas 22 of the cover member 12. It will be noted from the showing of Fig. 1 that these imperforate areas 22 have perforated areas 24 lying therebetween, the imperforate areas constituting a minor portion of the entire area of the cover member. Thus, when the cover member bearing the spaced bands of adhesive is wrapped around the filter element 10, spaced annular bonds will be effected between the outer peaks 16 and the cover member 12.

The axial edges of the cover member are overlapped with an interposed film of thermoplastic adhesive 26 so as to produce an axial seam 28. The adhesive 20 bonding the cover member 12 to the filter element 10 is preferably thermosetting as is the adhesive 30 employed to effect an axial seam between the terminal walls of the filter element itself. By virtue of this selection of thermoplastic and thermosetting adhesives, when the assembly as depicted in Fig. 1, including the end caps 32 and 34 coated with thermosetting adhesive 36 to produce a bond with the ends of the filter element 10 and cover member 12, is subjected to a superatmospheric temperature, for example, 300° F., while the thermosetting adhesive is curing, the thermoplastic adhesive 26 will permit just the correct degree of shrinking of the cover element 12 to impose the proper stresses upon the walls defining the pleats of the filter element 10. Since the adhesive forming the seam of the cover member 12 is thermoplastic, it will prevent rupture of the cover member should the degree of shrinkage tend to become excessive. The extent of the shrinkage of the cover member is controllable by adjusting its moisture content prior to the application of heat.

The phenolic resin with which the filter element and cover member are impregnated may be similar to that constituting the thermosetting adhesive employed so that highly satisfactory bonds will be assured.

Filters constructed in accordance with the present invention have made it possible to utilize only sixty pleats to produce the same filtering effects formerly requiring one hundred and six pleats. The resultant saving in material is indicative of the degree of improvement over the prior art.

Whereas the invention has been described with respect to a single illustration, it is not to be construed as restricted thereto as to form or materials, beyond the scope of the appended claims.

I claim:

1. A filter comprising a permeable impregnated paper filter element having axial pleats defining a plurality of inner and outer peaks, said outer peaks being spaced apart and lying substantially in a cylinder, a substantially uniformly permeable core disposed within said element for engagement with said inner peaks, an annular cover member permeable substantially throughout its length embracing said outer peaks throughout their length, and axially separated annular bands of adhesive bonding said cover member to said outer peaks.

2. A filter as set forth in claim 1 wherein said cover member possesses annular imperforate areas for application of said adhesive bands and perforated areas between said bands.

3. A filter as set forth in claim 1 wherein said adhesive covers a minor area of said cover member.

4. A filter comprising a permeable impregnated paper filter element having axial pleats with walls of unequal depths defining a plurality of inner and outer peaks, said outer peaks being spaced apart and lying substantially in a cylinder, a substantially uniformly permeable core disposed within said element for engagement with said inner peaks, an annular cover member permeable substantially throughout its length embracing said outer peaks throughout their length, and an adhesive bonding said cover member to said outer peaks.

5. A filter as set forth in claim 4 wherein said cover contains an axial seam bonded with thermoplastic adhesive.

6. A filter as set forth in claim 4 wherein said adhesive is thermosetting.

7. A filter as set forth in claim 4 wherein said adhesive is thermosetting and said cover contains an axial seam bonded with thermoplastic adhesive.

8. A filter as set forth in claim 4 wherein said walls are under stress.

9. A filter as set forth in claim 4 wherein said inner peaks engage said core and certain of said walls are bowed.

10. A method of maintaining adjacent pleats of an annular filter element in spaced relationship comprising circumscribing said element with a cover member and simultaneously shrinking said cover member about and bonding it to peripheral portions of said pleats.

11. A method as set forth in claim 10 wherein said shrinking and bonding are effected at a superatmospheric temperature.

References Cited in the file of this patent
UNITED STATES PATENTS
2,748,948   Fricke et al. _____ June 5, 1956